United States Patent Office 3,142,655
Patented July 28, 1964

3,142,655
ORGANOPOLYSILOXANE COMPOSITIONS INCORPORATING HEAT-AGE RESISTANT RARE EARTH COMPOUNDS
William J. Bobear, Latham, N.Y., assignor to General Electric Company, a corporation of New York
No Drawing. Filed Mar. 23, 1960, Ser. No. 16,973
7 Claims. (Cl. 260—37)

The present invention relates to improved organopolysiloxane rubber compositions and to a method for making them. More particularly, the present invention relates to a method of producing organopolysiloxane rubber compositions having improved heat-age resistance by incorporating rare earth compounds and mixtures thereof into organopolysiloxanes, and to the resulting rubber compositions produced thereby.

Organopolysiloxane rubber compositions are generally recognized as being more temperature resistant and less subject to decomposition than the more conventional type synthetic-organic or natural rubbers. A serious problem that has troubled industry is that organopolysiloxane rubber compositions often become brittle and lose many of their desirable qualities after extensive use at elevated temperatures. Heat-aging of organopolysiloxane rubber compositions can be reduced by incorporating into the polymer effective amounts of red iron oxide during the manufacturing stages. As a result, the useful life of organopolysiloxane rubber compositions have been substantially increased.

While red iron oxide has improved the heat-age resistance of organopolysiloxane rubber compositions, it has a vivid red color and must be incorporated into the organopolysiloxane rubber composition in relatively high amounts to be an effective heat-age additive. As a result its red color is imparted to the final cured rubber composition, rendering it unsuitable for many purposes.

It has now been discovered that by incorporating an effective amount of certain color-free rare earth compounds and mixtures thereof into organopolysiloxanes having an average of about 1.98 to 2.01 organo radicals per silicon atom, markedly improved color-free rubber compositions are produced that exhibit superior resistance to heat-aging. An effective amount is an amount of heat-age additive sufficient to impart to a cured organopolysiloxane rubber sample an improved resistance to heat-aging, as compared to a sample containing no heat-age additive. Heat-aging causes an alteration in the desirable physical properties of an oragnopolysiloxane polymer at a temperature above 150° C. over an extended period of time.

In accordance with the preferred form of the present invention, there is provided a color-free organopolysiloxane rubber composition having improved resistance to heat-aging comprising (1) 100 parts of an organopolysiloxane, (2) 10 to 200 parts of a filler, (3) 0.001 to 1 and preferably 0.008 to .1 part of rare earth metal in the form of a rare earth composition selected from the class of rare earth salts and mixtures of rare earth salts, said organopolysiloxane having a viscosity of at least 100,000 centipoises when measured at 25° C. and whose organo radicals are members selected from the class of monovalent hydrocarbon radicals, halogenated monovalent hydrocarbon radicals, and cyanoalkyl radicals, said organic radicals being attached to silicon by carbon-silicon linkages, there being an average of about 1.98 to 2.01 organo radicals per silicon atom.

The rare earth compounds that have been found to be operable as heat-age additives in the present invention preferably include rare earth salts, such as the octoates, chlorides, acetates, oxalates, fluorides, sulphates, nitrates, naphthenates, etc. of cerium, lanthanum, neodymium, praseodymium, samarium, gadolinium, yttrium, etc. and mixtures thereof. The rare earth octoate salts and chloride salts and respective mixtures thereof, are particularly preferred. The oxides of the rare earth metals have also substantially improved heat-aging or organopolysiloxane rubber compositions when added in effective amounts.

Mixtures of the various rare earth compounds recited above can also be employed as heat-age additives for organopolysiloxane rubber compositions in the form of salt mixtures or rare earth oxide mixtures. A particularly preferred mixture of rare earth compounds, hereinafter referred to as the "preferred mixture," is a mixture in which the rare earth compounds present are compounds of rare earth metals found in monazite ore; a rare earth compound is present in the preferred mixture at approximately the same weight ratio, based on its weight as rare earth metal, as it is present in monazite ore. The composition of monazite ore is shown in volume 3, page 638 in the Encyclopedia of Chemical Technology (1954), Interscience Encyclopedia, New York, New York. One form of the preferred mixture is an oxide mixture that is illustrated as follows:

| | Percent |
|---|---|
| Cerium oxide | 45 |
| Lanthanum oxide | 22.5 |
| Neodymium oxide | 17.9 |
| Praseodymium oxide | 5.5 |
| Samarium oxide | 1.9 |
| Gadolinium oxide | 0.5 |
| Yttrium oxides | 0.2 |
| Other rare earth oxides | 0.3 |
| Thorium oxide, max | 0.25 |
| Sulfate | 1.5 |
| Phosphate | 0.8 |
| Sodium oxide | 0.2 |
| Calcium and magnesium oxides | 1.0 |
| Iron and aluminum oxides | 0.3 |
| Silica | 0.3 |

In addition to improving the heat-aging properties of organopolysiloxane rubber compositions, it has also been discovered that rare earth compounds, particularly the oxides, also impart reversion resistance to organopolysiloxane rubber compositions when employed in terms of rare earth metal in the range of about 3 to about 12 percent by weight of the organopolysiloxane polymer. This discovery was also quite unexpected since reversion, that is, the depolymerization of organopolysiloxane polymers at elevated temperatures, under sealed conditions, is usually catalyzed by metallic contaminants. Again, the incorporation of rare earth oxides into organopolysiloxane rubber compositions in amounts as high as 16 to 40 parts by weight in terms of rare earth metal per 100 parts of organopolysiloxane polymer was also found to substantially improve the heat-aging characteristics of the resulting organopolysiloxane rubber composition.

The fillers that are employed along with the rare earth compounds of the present invention in preparing the novel, improved organopolysiloxane compositions of the present invention, are known to the art as reinforcing, and semi-reinforcing fillers. The reinforcing fillers, such as the silica fillers, including fumed silica, precipitated silica and the like, are structure inducing and, depending on their manufacture, may contain or be free of hydroxyl groups either in the form of adsorbed moisture or bonded to silicon atoms. These structure inducing silicone rubber fillers may be modified such as, for example, by the introduction of silicon-bonded alkoxy groups in place of some hydroxyl groups, resulting in some advantages as decreased structure when incorporated with a convertible organopolysiloxane composition.

The preferred silica filler of the present invention is a fumed silica filler made by fuming processes including the vapor phase burning of silicon tetrachloride or ethylsilicate, an example being what is known to the trade as Cab-O-Sil. Since a fumed silica contains a relatively low degree of moisture, it is particularly valuable as a filler additive in electrical applications, requiring a high resistance to reversion. Examples of other silica reinforcing fillers may be found described in U.S. Patents 2,541,137, 2,610,167 and 2,657,149. Such fillers may be slightly acidic or alkaline (that is, have pH's below or above 7) depending upon the method of manufacture, such as by aerogel process. Examples of semi-reinforcing or usually nonstructure forming type, are titanium oxide, lithopone, calcium carbonate, iron oxide, and diatomaceous earth.

The convertible organopolysiloxanes used in connection with this invention can be viscous masses or gummy solids depending upon the state of condensation of the starting organopolysiloxanes polymerizing agent, etc. and will hereinafter for convenience be referred to as "convertible organopolysiloxanes." Although the convertible organopolysiloxanes used in the present invention are well known in the art, attention is directed to the convertible organopolysiloxanes disclosed in Agens Patent 2,448,756 and Sprung et al. Patent 2,448,556, the latter two patents being issued September 7, 1948, Sprung Patent 2,484,595, issued October 11, 1949; Krieble et al. Patent 2,457,688, issued December 28, 1948; Marsden Patent 2,521,528, issued September 5, 1950—all the foregoing patents being assigned to the same assignee as the present invention; Hyde Patent 2,490,357, issued December 5, 1949; and Warrick Patent 2,541,137, issued February 13, 1951. It will, of course, be understood by those skilled in the art that the convertible organopolysiloxanes referred to herein contain the same or different silicon-bonded organic substituents (e.g., methyl, ethyl, propyl, vinyl, allyl, phenyl, tolyl, xylyl, benzyl, phenylethyl, naphthyl, chlorophenyl, cyanoethyl, both methyl and phenyl, etc. radicals) connected to the silicon atoms by carbon-silicon linkages, may be employed in the present invention without departing from the scope of this invention.

The particular convertible organopolysiloxanes used are not critical and may be any one of those described in the foregoing patents. They may be viscous masses or gummy solids depending upon the state of condensation of the starting organopolysiloxanes, polymerizing agent, etc., and may be prepared by condensation of a liquid organopolysiloxane containing an average of about 1.95, preferably from about 1.98 to about 2.01 organic groups per silicon atom. The polymerizing agents that can be employed are well known in the art and can include, for instance, ferric chloride hexahydrate, phenyl phosphoryl chloride; alkaline condensing agents such as potassium hydroxide, sodium hydroxide, etc. Each convertible organopolysiloxane generally comprises a polymeric diorganosiloxane which can contain, if desired, for example, up to 2 mole percent copolymerized monoorganosiloxane, for example, copolymerized monomethylsiloxane and a small molar (e.g., less than 1 mole) percent of triorganosiloxy units, e.g., trimethylsiloxy units. Generally, it is preferred to use as the starting liquid organosiloxanes (or mixtures of organopolysiloxanes) from which the convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms in which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane can be one in which all the siloxane units are $(CH_3)_2SiO$, or the siloxane can be a copolymer of dimethylsiloxane with a minor amount (e.g., from 1 to 20 or more mole percent) of any of the following units, separately or mixtures thereof: $C_6H_5(CH_3)SiO$ and $(C_6H_5)_2SiO$. The presence of halogen, e.g., chlorine, atoms on the phenyl nucleus is also within the purview of the present invention.

Where alkenyl groups are attached to silicon by carbon-silicon linkages, it is preferable that the alkenyl groups (for instance, vinyl groups, allyl groups, etc.) be present in an amount equal to from 0.05 to 2 mole percent of the total number of silicon bonded organic groups in the convertible organopolysiloxane.

Various curing agents to effect more rapid conversion of the convertible organopolysiloxane to the cured, solid, elastic state can be incorporated. Among such curing agents can be mentioned, for instance, benzoyl peroxide, tertiary butyl perbenzoate, bis-(2,4-dichlorobenzoyl) peroxide, etc. These curing agents (or "vulcanization accelerators" as they are often designated) can be presented in amounts ranging from about 0.1 to as high as 4 to 8 percent or more, by weight, based on the weight of the convertible organopolysiloxane. High energy electron irradiation without curing agents can also be employed for vulcanizing purposes.

The rare earth compounds can be incorporated into convertible organopolysiloxane formulation in any desired manner. A preferred procedure when adding the rare earth compound in the form of a rare earth oxide or oxide mixture, is to initially grind the rare earth oxide to reduce its particle size to 50 microns or below to avoid possible modification of the properties desired in the final cured rubber product.

If the rare earth compound is incorporated into the organopolysiloxane in the form of a salt, such as an octoate, chloride or acetate, or in the form of a salt mixture, it has been found expedient to add the rare earth compound to the organopolysiloxane formulation in the form of a solution. The octoate, or mixture thereof, for example, can be added in the form of an organic solvent solution, while the acetate and chloride or respective mixtures thereof, can be added to the organopolysiloxane in the form of a water solution.

Although the rare earth compound can be incorporated into the organopolysiloxane at any stage of the processing, that is, directly into the organopolysiloxane polymer or along with the filler, or the mixture of the polymer and the filler, it is advisable to add it prior to the addition of the curing catalyst. A convenient way to add the rare earth compound to the organopolysiloxane in the form of rare earth oxide, or oxide mixture, is to add the rare earth oxide along with the filler while milling the organopolysiloxane. If it is desired to add the rare earth compound in the form of a salt or salt mixture such as an octoate, an organic solvent solution of the octoate can be added to the polymer during the milling stages along with the addition of the filler material. Suitable organic solvents that can be employed with rare earth octoates are for example toluene, benzene, xylene, etc. A somewhat similar procedure can be employed when incorporating the rare earth compound in the form of a chloride or acetate or respective mixtures by adding the rare earth salt during the compounding stages of the organopolysiloxane and filler in the form of a water solution. In the event a water solution of a chloride or acetate is added to the polymer-filler mixture, it is advisable to eliminate excess amounts of water from the system prior to the curing of the organopolysiloxane-filler mixture. This can be accomplished conveniently by employing external heat and a high degree of circulation around the vicinity of the uncured mixture.

The addition of a suitable curing agent can be performed at any stage of the processing but it is preferred to add it after mixing the organopolysiloxane gum with the filler and the rare earth compound. Thereafter, the composition can be molded or used in any application desired. When molding the curable organopolysiloxane formulation, pressures from about 100 to 2,000 p.s.i. or more may be employed in combination with temperatures ranging from about 80° C. to 200° C. or higher. Under such conditions, the time required for effecting the desired cure will depend upon such factors as the type of curing agent, concentration thereof, the type of organopolysiloxane, and type and amount of filler, the use desired, etc. Persons skilled in the art will have little difficulty in determining the optimum conditions under various situations involving different temperatures, proportions and ingredients.

A suitable convertible dimethylpolysiloxane composition was prepared as follows to be used later in the examples to illustrate the practice of the invention.

One hundred parts of octamethylcyclopolysiloxane was heated to a range of 110° to 155° while agitating the mass with 0.001 part by weight of potassium hydroxide for about 4 hours to obtain a highly viscous benzene soluble mass of only slight flow. This material had a ratio of approximately two methyl groups per silicon atom and had a viscosity of about 6 million centistokes.

Commercially available rare earth compounds were employed in the examples as supplied from the manufacturer. When utilized in the examples as mixtures, the mixtures were in the preferred form, i.e. approximating the composition of monazite ore. A rare earth oxide mixture was ground to a suitable particle size with a mortar and pestle, while octoates in the form of a mixture, and a serous octoate salt, were employed in the form of an organic solvent solution. Rare earth salts in the form of cerium chloride, lanthanum chloride, neodymium chloride, and lanthanum acetate, and mixtures of rare earth chlorides and acetates, were obtained in crystalline form, and were used in the form of a water solution.

Throughout the examples, the rare earth compounds and mixtures are expressed in parts by weight of metal to provide uniformity. The octoates in the form of an organic solvent solution were used directly as obtained from the manufacturer.

In order that those skilled in the art may better understand how the present invention can be practiced, the following examples are given by way of illustration and not by way of limitation. All parts are by weight.

EXAMPLE 1

A mixture of 100 parts of the convertible dimethylpolysiloxane and 4 parts of diphenylsilanediol were milled on a two roll mill while 0.01 part of rare earth metal in the form of an organic solvent solution of a rare earth octoate mixture was added to the polymer. After the addition of the rare earth metal, 45 parts of fumed silica was gradually added to the resulting organopolysiloxane formulation. When the reinforced organopolysiloxane formulation had been thoroughly mixed, 0.9 part of a 50 percent benzoyl peroxide paste was added. Test strips in the form of ASTM slabs were molded from the resulting mixture for 10 minutes at about 132° C. and post baked for 24 hours at about 250° C. The test strips were then heat-aged for an additional 24 hours at 315° C. Following the same procedure additional test strips were made from organopolysiloxane compositions containing 0.02 part, 0.04 part, 0.08 part, and 0.40 part of rare earth metal in the form of a rare earth octoate mixture.

EAMXPLE 2

The procedure of Example 1 was repeated except that the rare earth metal was added to the organopolysiloxane formulation in the form of a water solution of a mixture of rare earth chlorides. The rare earth chlorides were added to the polymer along with the reinforcing filler. The reinforced organopolysiloxane polymer was further heated to eliminate excess water. After properly cooling the milled formulation, the curing catalyst was added and the procedure of Example 1 was continued. Additional test strips containing the rare earth chloride additive in other concentrations were made. Test strips were made having .008 part, .021 part, 0.062 and 0.083 part of rare earth metal respectively in the form of a rare earth chloride mixture.

EXAMPLE 3

The procedure of Example 2 was repeated, except that the rare earth compound was added to the organopolysiloxane formulation in the form of a water solution of a rare earth acetate mixture. A series of test samples were prepared from the resulting organopolysiloxane formulation that contained rare earth acetates in the amount of 0.008, 0.021, 0.042, and 0.083 part per hundred of polymer expressed in terms of rare earth metal.

EXAMPLE 4

The procedure of Example 1 was repeated except ASTM slabs were prepared that contained cerous octoate. Test samples were made that contained .01 part, .02 part, .04 part and 0.1 part of rare earth metal per 100 parts of polymer.

EXAMPLE 5

Test samples were prepared in accordance with the procedure of Example 2, except that .035 part and .06 part of rare earth metal was employed in the form of cerium chloride.

EXAMPLE 6

One hundred parts of the convertible dimethylpolysiloxane and 4 parts of diphenylsilandiol were placed in a doughmixer, and a mixture of 40 parts of fumed silica and 16.5 parts of rare earth metal in the form of a rare earth oxide mixture were gradually added. After the formulation was mixed for one hour at 110 to 115° C., two parts of benzoyl peroxide were added. When the composition had rested for 24 hours, slabs were cut from a sheet formed by milling the composition further. The slabs were press cured and post cured for 1 hour at 150° C., and 24 hours at 250° C. Test samples were then prepared in accordance with the procedure of Example 1. Additional test strips were made that contained 1.6 parts, 8.5 parts and 25 parts of rare earth metal. The test strips were then heat-aged for an additional 24 hours at 315° C.

EXAMPLE 7

In accordance with the procedure of Example 3, ASTM slabs were prepared that contained .035 part and .06 part of rare earth metal in the form of lanthanum acetate.

EXAMPLE 8

The procedure of Example 2 was repeated, except that test samples were prepared that contained .035 part and .06 part of rare earth metal in the form of lanthanum chloride.

EXAMPLE 9

In accordance with the procedure of Example 2, test samples were prepared that contained .035 part and .06 part of rare earth metal in the form of neodymium chloride.

Control strips were also made in accordance with the above procedure that contained 5 parts of red iron oxide per hundred parts of organopolysiloxane polymer. In addition, control strips were made that were free of a heat-age additive.

After the test strips of the examples and the controls were press cured and conditioned for 24 hours at 250°

C., measurements were made with the strips according to ASTM specifications as shown in Table I below. Shore A hardness (H), tensile strength, p.s.i. (T), and elongation percent (E), were determined. After the initial measurements were taken, the test strips were subjected to an additional heat treatment by placing them in an oven 24 hours at about 315° C. Measurements were again taken to determine whether the properties of the strips were altered due to the possible effects of heat-aging. The parts by weight of rare earth compounds in Table I below are expressed in terms of rare earth metal per 100 parts of polymer. "R.E." in the table is used as an abbreviation for "rare earth."

Table I

| Additive | Parts | Cured 24-hrs./250° C. | | | Heat aged 24-hrs./ 315° C. | | |
|---|---|---|---|---|---|---|---|
| | | H | T | E | H | T | E |
| None | | 56 | 938 | 310 | (¹) | (¹) | (¹) |
| Red Iron Oxide | 5 | 56 | 828 | 310 | 71 | 570 | 190 |
| R.E. (Octoate) | 0.02 | 50 | 915 | 380 | 64 | 459 | 180 |
| Do | 0.04 | 49 | 941 | 430 | 55 | 641 | 210 |
| Do | 0.08 | 51 | 832 | 430 | 72 | 674 | 140 |
| Do | 0.40 | 64 | 583 | 220 | 88 | 597 | 20 |
| R.E. (Chloride) | .008 | 55 | 1,048 | 310 | 80 | 347 | 30 |
| Do | 0.021 | 57 | 1,087 | 350 | 64 | 677 | 230 |
| Do | 0.062 | 54 | 904 | 410 | 66 | 645 | 260 |
| Do | 0.083 | 50 | 723 | 350 | 60 | 493 | 160 |
| R.E. (Acetate) | 0.021 | 59 | 1,008 | 310 | 83 | 686 | 70 |
| Do | 0.042 | 58 | 1,041 | 310 | 73 | 674 | 110 |
| Do | 0.083 | 59 | 932 | 300 | 76 | 515 | 80 |
| Cerous (Octoate) | .01 | 54 | 925 | 320 | 88 | | |
| Do | .02 | 52 | 787 | 320 | 65 | 395 | 100 |
| Do | .04 | 54 | 795 | 280 | 70 | 600 | 110 |
| Do | 0.10 | 49 | 680 | 310 | 70 | 470 | 90 |
| Ceric (Chloride) | .035 | 56 | 1,240 | 370 | 62 | 610 | 230 |
| Do | .06 | 55 | 1,100 | 390 | 62 | 630 | 240 |
| R.E. (Oxide) | 16.5 | 54 | 752 | 340 | 88 | 559 | 20 |
| Do | 25 | 54 | 1,430 | 360 | 84 | 615 | 40 |

¹ Too brittle to test.

In addition to the above data, the test samples prepared in accordance with Examples 7, 8, and 9, containing 0.035 part and 0.06 part of rare earth metal in the form of lanthanum acetate, lanthanum chloride, and neodymium chloride respectively, also clearly imparted an increased resistance to heat-aging to the test samples as compared to test samples containing no heat-age additive.

The data of Table I clearly illustrates the effectiveness of color-free rare-earth compounds in imparting substantially improved heat-age resistance to organopolysiloxane rubber compositions. In addition, the rare-earth salts and mixtures thereof of the present invention, are as effective as iron oxide as a heat-age additive at considerably lower weight levels. Again, the resulting rare-earth containing organopolysiloxane compositions are substantially the same color as the controls containing no heat-age additive.

Considerable efforts have been concentrated in overcoming the problem of reversion. Unlike heat-aging, which is attributed in part to the decomposition of the organopolysiloxane polymer by containing metal ions at elevated temperatures, reversion of organopolysiloxane polymers takes place under sealed conditions at elevated temperatures, and in the presence of water. For example, reversion of organopolysiloxane polymers can occur in such sealed systems as cables, gaskets, and the like. Moisture can be introduced into the system by absorption from the atmosphere or from materials such as the filler ingredient. The following example illustrates the use of rare earth oxides as a reversion inhibitor for organopolysiloxane compositions.

EXAMPLE 10

One hundred parts of the convertible dimethylpolysiloxane and 8 parts of diphenylsilandiol were placed in a doughmixer, and a mixture of 40 parts of fumed silica and 8 parts of rare earth oxide was gradually added. After the formulation was mixed for one hour at 110 to 115° C., two parts of benzoyl peroxide was added. The composition was allowed to rest for 24 hours, and slabs were then cut from a sheet formed by milling the composition further. The slabs were first cured for 10 minutes at 125° C. and then post-cured for 1 hour at 150° C., and 24 hours at 250° C. Test samples were then prepared by cutting the slab into 0.5 inch, by inch, by 0.75 inch strips. In addition to the compositions containing 8 parts of a rare-earth oxide mixture, test strips were made that contained 6 parts and 12 parts respectively. Control strips were also made in accordance with the procedure of Example 10 except that the rare earth oxide mixture was omitted from the formulation.

The control strips and the compositions of Example 10 were then placed in a desiccator containing a saturated solution of sodium chloride for one week in order to condition the strips at a temperature of 25° C. and a relative humidity of about 75 percent. The treated strips were then placed in sealed tubes and heated further at a temperature of about 250° C. for 24 hours.

Table II shows the results of the test to determine the effectiveness of rare earth oxide as a reversion inhibitor for organopolysiloxane compositions. Measurements were taken according to ASTM procedures after the strips were conditioned for one week, and repeated after the respective strips were subjected to the sealed tube treatment for 24 hours at 250° C. The measurements represented by hardness (H), tensile (T), and elongation (E), are based on the average value of four strips tested. The parts by weight of rare earth additive in Table II are based on the weight of rare earth metal per 100 parts of polymer.

Table II

| Additive | Parts | Conditioned 1 Wk.—75 RH/25° C. | | | Sealed 24-hrs., 250° C. | | |
|---|---|---|---|---|---|---|---|
| | | H | T | E | H | T | E |
| None | | 59 | 745 | 250 | 42 | 109 | 140 |
| R. E. (Oxide) | 5 | 62 | 660 | 230 | 45 | 170 | 200 |
| Do | 6.5 | 62 | 690 | 200 | 46 | 235 | 210 |
| Do | 10 | 62 | 715 | 200 | 44 | 180 | 180 |

The above values clearly illustrate the superior properties of the compositions of the present invention containing a rare earth oxide additive, over the control in resisting reversion.

While the foregoing examples have of necessity been limited to only a few of the very many variables within the scope of the present invention, it should be understood that the present invention covers a much broader class of organopolysiloxane compositions containing the rare earth compounds included within the scope of the present invention. All of these various materials are prepared by methods specifically illustrated in the examples above and described further in the foregoing description of the present invention.

As a result of the present invention silicone rubber having superior resistance to heat-age and reversion are now available to the art. These improved rubber compositions are ideally suitable as materials that are either color-free, or more easily colored to a variety of shades by conventional pigments.

What I claim as new and desire to secure by Letters Patent of the United States is:

1. Organopolysiloxane compositions comprising (1) an organopolysiloxane, (2) a filler, and (3) a rare earth material in an amount effective for stabilization of said organopolysiloxane comprising a mixture of compounds selected from the class consisting of octoates, chlorides, acetates, oxalates, fluorides, sulphates, nitrates, naphthenates, and oxides of rare earth metals consisting essentially of cerium, lanthanum, neodymium, praseodymium, samarium, gadolinium, and yttrium, where, each of said rare earth metals has a weight percent in said mixture which is approximately proportional to its weight percent in monazite ore, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

2. Organopolysiloxane compositions comprising by weight (1) 100 parts of an organopolysiloxane, (2) 10 to 200 parts of a filler, and (3) 0.001 to 1 part of a mixture of octoates of rare earth metals consisting essentially of cerium, lanthanum, neodymium, praseodymium, samarium, gadolinium, and yttrium, where each of said rare earth metals has a weight percent in said mixture which is approximately proportional to its weight percent in monazite ore, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

3. Organopolysiloxane compositions comprising by weight (1) 100 parts of an organopolysiloxane, (2) 10 to 200 parts of a filler, and (3) 0.001 to 1 part of a mixture of chlorides of rare earth metals consisting essentially of cerium, lanthanum, neodyminum, praseodymium, samarium, gadolinium, and yttrium, where each of said rare earth metals has a weight percent in said mixture which is approximately proportional to its weight percent in monazite ore, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

4. Organopolysiloxane compositions comprising by weight (1) 100 parts of an organopolysiloxane, (2) 10 to 200 parts of a filler, and (3) 0.001 to 1 part of a mixture of acetates of rare earth metals consisting essentially of cerium, lanthanum, neodymium, praseodymium, samarium, gadolinium, and yttrium, where each of said rare earth metals has a weight percent in said mixture which is approximately proportional to its weight percent in monazite ore, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

5. Organopolysiloxane compositions comprising by weight (1) 100 parts of an organopolysiloxane, (2) 10 to 200 parts of a filler, and (3) 0.001 to 1 part of a mixture of naphthenates of rare earth metals consisting essentially of cerium, lanthanum, neodymium, praseodymium, samarium, gadolinium, and yttrium, where each of said rare earth metals has a weight percent in said mixture which is approximately proportional to its weight percent in monazite ore, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

6. Organopolysiloxane compositions comprising by weight (1) 100 parts of an organopolysiloxane, (2) 10 to 200 parts of a filler, and (3) 15 to 25 parts of a mixture of oxides of rare earth metals consisting essentially of cerium, lanthanum, neodymium, praseodymium, samarium, gadolinium, and yttrium, where each of said rare earth metals has a weight percent in said mixture which is approximately proportional to its weight percent in monazite ore, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals and cyanoalkyl radicals, there being an average of about 1.98 to 2.01 organo radicals per silicon atom.

7. A process for making organopolysiloxane compositions comprising mixing together (1) an organopolysiloxane, (2) a filler, and (3) a rare earth material in an amount effective for stabilization of said organopolysiloxane, said rare earth material comprising a mixture of compounds selected from the class consisting of octoates, chlorides, acetates, oxalates, fluorides, sulfates, nitrates, naphthenates, and oxides of rare earth metals consisting essentially of cerium, lanthanum, neodymium, praseodymium, samarium, gadolinium, and yttrium, where each of said rare earth metals has a weight percent in said mixture which is approximately proportional to its weight percent in monazite ore, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

References Cited in the file of this patent

UNITED STATES PATENTS

| | | |
|---|---|---|
| 2,449,572 | Welsh | Sept. 21, 1948 |
| 2,759,904 | Talcott | Aug. 21, 1956 |
| 2,830,968 | Clark | Apr. 15, 1958 |
| 2,855,380 | Hedlund | Oct. 7, 1958 |
| 2,868,751 | Johnson et al. | Jan. 13, 1959 |
| 2,999,076 | Talcott | Sept. 5, 1961 |

UNITED STATES PATENT OFFICE
CERTIFICATE OF CORRECTION

Patent No. 3,142,655            July 28, 1964

William J. Bobear

It is hereby certified that error appears in the above numbered patent requiring correction and that the said Letters Patent should read as corrected below.

Column 9, lines 11, 26, 42 and 57, and column 10, line 15, after "of", second occurrence, each occurrence, insert -- rare earth metal in the form of --.

Signed and sealed this 24th day of November 1964.

(SEAL)
Attest:

ERNEST W. SWIDER            EDWARD J. BRENNER
Attesting Officer            Commissioner of Patents